(12) United States Patent
Hodges et al.

(10) Patent No.: US 6,254,902 B1
(45) Date of Patent: Jul. 3, 2001

(54) TEA MANUFACTURE

(75) Inventors: Rosalind Clare Hodges; Jonathan David Mawson, both of Bedford (GB)

(73) Assignee: Lipton, a division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/375,897

(22) Filed: Aug. 17, 1999

(30) Foreign Application Priority Data

Aug. 17, 1998 (EP) .................................................. 98306543

(51) Int. Cl.[7] ........................................................ A23B 7/10
(52) U.S. Cl. .............................. 426/49; 426/445; 426/447; 426/597
(58) Field of Search ............................... 426/597, 49, 445, 426/447

(56) References Cited

U.S. PATENT DOCUMENTS

| 3,966,986 | 6/1976 | Hunter et al. . |
| 4,307,733 | 12/1981 | Teng et al. . |
| 4,340,073 | 7/1982 | Burde et al. . |
| 4,556,575 | * 12/1985 | Katz et al. . |
| 5,020,550 | 6/1991 | Uchiyama et al. . |

FOREIGN PATENT DOCUMENTS

| 167399 | * 1/1986 | (EP) . |
| 710766 | 6/1954 | (GB) . |
| 2 243 675 | 6/1991 | (GB) . |

OTHER PUBLICATIONS

European Search Report.
German and translation of "Cracking and Puffing of Plant Material By High–Pressure Treatment With $CO_2$: I: Linseed and Hibiscus Flowers"; E. Stahl et al.; Z. Lebensm Untersuch.–Forsch., 1996, 182:33–35.
"Puffing Dehydrated Green Bell Peppers With Carbon Dioxide"; D. Saputra et al.; American Society of Agricultural Engineers; 1991:475–480; vol. 34 (2).
"Puffing Potato Pieces With $CO_2$"; Z. Tabeidie et al.; American Society of Agricultural Engineers; 1992:1935–1940; vol. 35 (6).

* cited by examiner

Primary Examiner—Anthony J. Weier
(74) Attorney, Agent, or Firm—James J. Farrell

(57) ABSTRACT

A method for processing whole leaf tea that involves impregnating tea leaves with liquid carbon dioxide within a pressure vessel, depressurising the vessel at a rate that is sufficient to freeze the liquid carbon dioxide, applying sufficient heat to cause the frozen carbon dioxide to sublime and consequently initiate fermentation within the leaves, allowing the tea to ferment for a time that is sufficient to achieve desired liquor properties, and drying the fermented product to yield the whole leaf tea. An apparatus for manufacturing such a leaf tea is also described.

9 Claims, 8 Drawing Sheets

Changes in the total levels of the key compounds involved in the black tea fermentation process Total catechins Total theaflavins Total Catechins Total theaflavins

TEA MANUFACTURE

The present invention relates to tea processing. More specifically, a method and apparatus for processing whole leaf tea by exploiting the thermodynamic properties of carbon dioxide as a means to initiate the fermentation reactions that occur in black tea manufacture.

BACKGROUND AND PRIOR ART

Leaf tea may be prepared as green leaf tea or black leaf tea. Generally, to prepare black leaf tea fresh green leaves of the plant *Camellia sinensis* are withered (subjected to mild drying), comminuted, fermented (in which process enzymes in the tea leaf use atmospheric oxygen to oxidise various substrates to produce brown-coloured products) and then fired (to dry the tea leaves). Green leaf tea is not exposed to the fermentation process. Partial fermentation may be used to produce intermediate-type teas known as "Oolong" tea.

Conventional wisdom dictates that tea must be macerated in some way to liberate the fermentative enzymes and their substrates within the leaves. One can macerate tea in many ways but broadly speaking there are two main mechanised methods for doing this.

The first, called "orthodox manufacture", involves rolling withered tea leaves as part of a standardised procedure including fermenting, firing and drying steps. So called "orthodox tea" is typically characterised by withered leaf portions that are aesthetically pleasing to many but produce lighter liquors due to less extensive fermentation.

The second method is the most popular of a number of non-orthodox methods that involves using a machine resembling a mangle that cuts, tears and curls tea leaves. The original machine was invented by W. McKercher in 1930 and is commonly referred to as a CTC (cut-tear-curl) machine. The finely cut product is known generically as "CTC tea" and is characterised by a fast infusion rate and strong colour. This method tends to produce tea that is more consistent and uniform in quality and than the orthodox method.

Both orthodox and CTC machines are often used in conjunction with a Rotorvane machine, which minces withered tea leaves. These methods and their history and role in tea manufacture are described in "Tea: Cultivation to Consumption" edited by K. C. Willson and M. N. Clifford, Chapman & Hall, 1992.

Generally speaking consumer preference for either orthodox or CTC tea is a matter of national or regional culture. In some countries the visual appearance and texture of leaf tea are both important indicators of quality, larger leaf particles being associated with higher quality. In Western markets tea is increasingly purchased in filter paper bags and the colour of the infused product tends to be more important.

Some consumers however want the best of both worlds; i.e. a leaf tea that looks and feels like orthodox processed tea but has the liquor characteristics of a fuller fermented CTC processed tea. Unfortunately there is no commercially available tea manufacturing equipment that can deliver such a leaf tea.

In response to those needs, the present inventors have developed a method for fermenting whole tea, a method for manufacturing a leaf tea that resembles orthodox processed tea but infuses like CTC processed tea, and an apparatus for processing leaf tea in accordance with predetermined qualities of visual appearance, texture, infusion rate and, of course, taste. This invention arose from their finding that fermentation can be initiated in whole leaf by impregnating it with liquid carbon dioxide and causing the carbon dioxide to sublime rapidly.

Expanding leaves with carbon dioxide or "$CO_2$ puffing" is a technique that is used within the tobacco industry to reduce the bulk density of the tobacco in cigarettes. It has also been used to improve the drying and rehydration properties of fruits and vegetables. The puffing process involves the release or expansion of a gas from within a product to either create an internal cell like structure or to expand and rupture an existing structure.

For example, U.S. Pat. No. 1,484,536 (Airco, Inc) discloses a process for puffing tobacco with $CO_2$ to increase its filling capacity.

U.S. Pat. No. 4,307,733 (Philip Morris) describes a method for expanding dried tobacco and various food products such as prunes, apricots, pears and raising by $CO_2$ puffing.

Tabeidie Z., Pane F. A. and Cornelius P. L. (1992) *"Puffing Potato Pieces with $CO_2$"* American Society of Agricultural Engineers, Vol 35 (6), pages 1935–1940 describes a method for increasing the bulk specific volume, volume ratio and rehydration ratio of dehydrated potato pieces by $CO_2$ puffing.

Saputra D., Pane F. A. and Cornelius P. L. (1991) *"Puffing Dehydrated Green Bell Peppers with Carbon Dioxide"* American Society of Agricultural Engineers, Vol 34 (2), pages 475–480 describes a method for increasing the bulk specific volume and rehydration ratio of green bell peppers by $CO_2$ puffing.

Stahl E., Rau G. and Carius W. (1986) *"Cracking and Puffing of Plant Material by $CO_2$ High Pressure Treatment"* Z. Lebensm. Untersuch Forsch, Vol 182, pages 33–35 discloses puffing linseed to increase its swelling index and puffing hibiscus flowers to extract acid and pigments more rapidly and completely.

The present inventors have found that one can initiate fermentation in whole tea leaves by developing a carbon dioxide puffing method.

STATEMENT OF THE INVENTION

In broad terms the present invention relates to a method for processing whole leaf tea comprising the steps of impregnating tea leaves with liquid carbon dioxide within a pressure vessel, depressurising the vessel at a rate that is sufficient to freeze the liquid carbon dioxide, applying sufficient heat to cause the frozen carbon dioxide to sublime and consequently initiate fermentation within the leaves, allowing the tea to ferment for a time that is sufficient to achieve desired liquor properties, and drying the fermented product to yield the whole leaf tea.

The invention also relates to a method for manufacturing a leaf tea that resembles orthodox processed tea but infuses like a CTC processed tea that comprises initiating fermentation of whole tea leaves by carbon dioxide puffing and terminating the fermentation when desired infusion properties have been achieved.

The invention further relates to an apparatus for processing whole leaf tea comprising a pressure vessel for holding whole tea leaves, means for supplying liquid carbon dioxide to the vessel, depressurising means for reducing the pressure within the vessel at a rate that is sufficient to freeze the liquid carbon dioxide, heating means for applying sufficient heat to cause the frozen carbon dioxide to sublime and consequently initiate fermentation within the leaves, and firing means for arresting the fermentation and drying the leaves.

The leaves may be withered, reduced in size or altered in shape at any stage between harvesting the tea leaves and arresting the fermentation.

"Tea" for the purposes of the present invention means leaf material from Camellia sinensis or Camellia assamica. It also includes rooibos tea obtained from Aspalathus linearis however that is a poor source of endogenous fermenting enzymes. "Tea" is also intended to include the product of blending two or more of any of these teas.

"Leaf tea" for the purposes of this invention means a tea product that contains one or more tea origins in an uninfused form.

"Whole leaf tea" includes tea leaves that are substantially intact, that is leaves that have not been macerated whether that be comminuted by cutting etc, disrupted by rolling, or by some other means. It could conveniently include single leaves, a cluster of leaves or the traditional two leaves and a bud. Substantial leaf fragments that are otherwise unmacerated may well behave like intact leaves and thus for the purposes of this invention they should be considered as "whole leaf tea" too.

For the avoidance of doubt the word 'comprising' is intended to mean including but not necessarily "consisting of" or "composed of". In other words the listed steps or options need not be exhaustive.

DETAILED DESCRIPTION OF THE INVENTION

Tea manufacture, especially black tea manufacture, traditionally comprises four basic steps: withering, rolling, fermenting and firing.

Withering is a process whereby the plucked tea leaves are stored for periods of time (perhaps up to 24 hours), during which they undergo various biochemical and physical changes which often includes a loss of moisture.

Maceration follows the withering step, and traditionally the withered leaves are optionally rolled to bruise and crush the leaves i.e. break down the plant tissue structure. This will have the effect of liberating fermentable substrates and fermenting enzymes such as polyphenol oxidase (PPO) from within the plant cells and tissue. The interaction between polyphenol oxidase and catechins in disrupted leaf is illustrated diagrammatically in FIG. 1. Modern tea manufacture usually includes this step however the plant cells and tissue is broken down by passing tea, which has usually been withered, through a cutting machine.

The next step is commonly called fermentation but that is a misnomer. "Fermentation" is commonly used in the context of brewing alcohol to describe the action of exogenous enzymes. However in the tea world it is used to refer to the oxidative process that tea undergoes when certain endogenous enzymes and substrates are brought together by mechanical disruption of the cells by tearing or cutting the leaves.

The present invention relates to method for processing leaf tea, especially whole leaf tea. The leaves can be withered in the normal way using art known techniques. Withering is not essential but it can be a useful means to enhance tea aroma. However, in contrast to CTC black tea manufacture, the leaves are not macerated before fermentation has been initiated.

Whole leaf tea, it seems, withered or not, will not spontaneously ferment. It must be triggered. The present inventors have found that fermentation can be initiated by $CO_2$ puffing whole tea leaves.

The conventional wisdom that whole leaf tea will not ferment has been supportable in some minds for two reasons: Firstly the catechins and relevant enzymes are not in sufficient proximity to react. Secondly assuming that sufficient oxygen would not be available with unmacerated leaf to facilitate fermentation.

However the present inventors recognised that leaves are respiratory organs and hence are designed to facilitate gaseous transfer. Indeed tea leaves are generally no more than nine cells thick.

The leaves are impregnated with liquid carbon dioxide within a pressure rig. Impregnation can be achieved by simply immersing the leaves in a charge of liquid carbon dioxide. By reducing the pressure one can cause the carbon dioxide and any water in the cells to freeze. This alone gives rise to a certain amount of intracellular expansion.

A preferred embodiment of such a rig is schematically represented in FIG. 2. The rig comprises a pressure vessel 1, which is an open-ended cylinder made from steel. The vessel has a gas inlet, the passage of gas through which is controlled by an inlet valve 3, two gas outlets, the passage of gas through which are controlled by outlet valves 6a and 6b, and a relief valve 9. The open end of the pressure vessel 1 is covered by a perspex disc 12 and a glass disc 15. These are removably secured to the vessel by a steel flange 18 by bolts 21. Pressure within the closed vessel is measured by a pressure gauge 24. Tea leaves 27 are suspended in the vessel on a wire mesh basket 30 that can be lowered into or raised out off a charge of liquid carbon dioxide.

The system should preferably be continually vented in order to maintain the required operating pressures. This will depend on the equilibrium pressure of the closed system constructed. The rig used by the inventors has a maximum working pressure of 69 bar. The relief valve set pressure was 86 bar. The rig was tested at a maximum of 104 bar.

The key operating variables for this system are leaf moisture content and the pressure in the vessel. This follows from both the morphological features of the tea leaves and the thermodynamic properties of carbon dioxide.

Leaf moisture content affects the glass transition temperature ($T_G$). Above this temperature a material will be amorphous and able to expand. Conversely, below this temperature a material will be crystalline, resistant to expansion and prone to shattering. However, the change from one state to the other is not distinct but occurs gradually as $T_G$ is approached. Thus the nature and type of damage done to a material will depend upon the proximity of its temperature in relation to $T_G$. At present the relationship between water content and the transition temperature is unclear for plant structures due to the diverse chemical composition of their cellular material. However, experimental data from other plant systems suggests that increasing the water content lowers the transition temperature. Some estimated figures are as follows.

TABLE 1

Change in transition temperature with moisture content

| Moisture content | Transition Temp. |
| --- | --- |
| Dry (approx 5%) | >80° C. |
| 20–30% | ~0° C. |
| 60% | <0° C. |

The pressure that the carbon dioxide is under in the vessel will determine the temperature of the system. However, as measuring the temperature within the rig during processing is technically difficult, an approximation must be calculated from first principles. The rig is operated such that the ratio of liquid to vapour is 1:1, thus during processing they will come into thermal equilibrium. Initially, the liquid will be at a slightly lower temperature due to evaporative cooling as the vapour is formed. However, once equilibrium is reached they will be at the same temperature and the vapour will be saturated. Therefore, using tables of thermodynamic properties from Perry's "Chemical Engineers Handbook", Perry, R. H., Green, D. W. and Maloney, J. O. 7th Edition (1977), McGraw Hill) it is possible to estimate the temperature within the rig. Excerpts from the Handbook have been reproduced below in Table 2.

TABLE 2

Data on temperature of liquid $CO_2$ in a pressure Cell under varying conditions

| Pressure | Temperature |
| --- | --- |
| 300 psi | $-18°$ C. |
| 500 psi | $-1°$ C. |
| 800 psi | $18°$ C. |

This demonstrates that attaining the correct moisture content of the material and operating pressure of the system are important in order to achieve the cellular disruption required to initiate fermentation.

The polyphenols are believed to be located within the vacuole and polyphenol oxidase is stored within the chloroplasts. Therefore in order to initiate the fermentation reaction both these structures must be disrupted to allow the interaction of PPO with the catechins.

The cellular damage caused by the carbon dioxide treatment, which can be observed by both light and electron microscopy, is similar to that in traditionally processed leaf. One difference being the lack of cell cleavage. The present inventor noted that after the leaf had been treated with carbon dioxide it was the midrib and veins within the leaf that first turned brown during fermentation. This brown colour change being indicative of the formation of theaflavins and thearubigins.

When analysed using light microscopy it was observed that significant structural damage had occurred to the cuticle and within the midrib due to the carbon dioxide treatment. It is likely that this physical damage aids the onset of the fermentation reactions either or both by increasing the interchange of cell contents and improving the diffusion of oxygen through these structures.

In traditional CTC manufacture the amount of damage done to the midrib, veins and tissue of the leaf is significantly greater as these structures are extensively disrupted. Furthermore the average particle size of leaves is reduced considerably and juice is expressed from the leaf. Thus both diffusion of oxygen into the cells and interchange of cell contents is greatly increased. Significant cellular structural differences have been observed between fresh and carbon dioxide treated leaf sections. However the extent of the intracellular cell disruption of traditionally macerated leaf is such that it ferments at a faster rate than carbon dioxide treated tea.

The fermented whole leaves are fired in the normal way using art known techniques to produce a black leaf tea product. Firing involves heating and drying the tea to initiate the fermenting enzymes and thereby arrest fermentation. It results in a reduction of moisture content to below 5%, and also leads to further chemical oxidation and changes in tea aroma. This generally involves exposing the tea to a blast of hot, dry air in a dryer.

The method of the invention will now be described with reference to the following examples and the accompanying drawings.

EXAMPLE 1

Feasibility of $CO_2$ Treatment and Colour Analysis of Leaf Tea

A Sri Lankan tea was $CO_2$ treated to initiate fermentation. The colour of the liquor made from the fermented tea was analysed and compared with the liquor prepared from traditional CTC manufactured sample of the same tea.

Raw Material

The bud and first two leaves of the fresh flush from Sri Lankan Clone 2 grown in greenhouses at Bedford, United Kingdom were used. This leaf was processed fresh and thus required no prior storage for withering.

Figure 2:
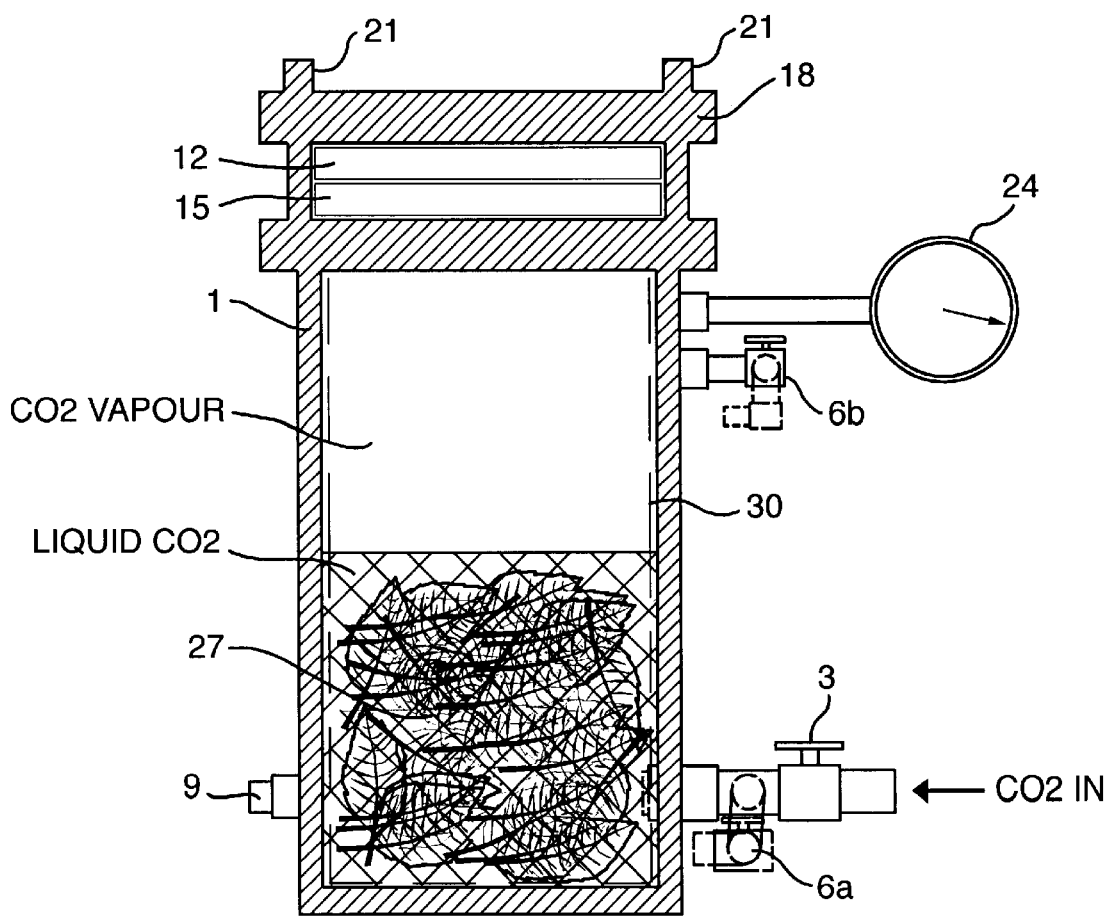
FIG. 2 is a diagram of the pressure rig that was used to initiate fermentation in whole tea leaves.

Carbon Dioxide Treatment of Leaf 50 g of fresh clone 2 tea flush was placed into a wire basket which was then transferred to the $CO_2$ pressure rig shown in FIG. 2 (2.5 litre $CO_2$ pressure vessel). The rig was sealed and liquid $CO_2$, drawn from a cylinder, and allowed to fill it such that the tea leaves were covered. At this point the liquid $CO_2$ supply was turned off and the leaf was left soaking for 5 minutes in order to allow the $CO_2$ to permeate into the cellular structure. After this equilibration period the pressure rig was rapidly decompressed using the outlet valves. After the lid of the pressure rig had been lifted the wire basket containing the leaf was removed and then dipped into a bucket of water at a fixed temperature. This leaf was then lightly dried with absorbent paper to remove excess surface moisture prior to fermentation.

Operating Conditions for the Pressure Rig

Operating pressure of 640 psi, equilibrium time of 8 minutes, decompression time of 30 seconds and heat treatment of 38° C. for 10 seconds.

Fermentation of Leaf 50 g of carbon dioxide treated leaf was placed in a fermenting tray which was then transferred into an environmental cabinet (a TEACRAFT (TM) withering and fermenting cabinet) at a fixed temperature (20° C.) and relative humidity (95%).

Drying of Leaf to Make Black Tea 50 g of treated fermented leaf was placed in a prewarmed (120° C. for 15 minutes) fluidised bed drier (Sherwood Scientific FBD (TM)). The leaf was dried for 15 minutes at 120° C, at blower speed 10 after which the blower speed was reduced to 3–4 until the moisture level was approximately 5%, typically a further 10 minutes. The black tea samples were then stored in sealed airtight foil pouches. The organoleptics of the liquors were assessed as follows:

Organoleptic Assessment of Black Tea 3 g of loose tea were liquored with 300 ml boiling deionised water for 3 minutes. The unmilked liquor was assessed by an informal panel of expert tea tasters. Their comments on the appearance, aroma and flavour of the infusion were noted. The tasters were not informed as to the identity of the samples but were briefed on the type of information required.

The liquor of the $CO_2$ treated sample was found to be slightly less brown in colour and not as bright in appearance as the traditional tea. In terms of flavour the treated sample was less bitter and astringent with a more 'rounded' flavour. However, it still possessed the characteristic Sri Lankan tea taste, though had less aroma impact and was noticeably less 'green' in smell.

Colour Analysis of Liquors

This analysis was performed on the liquors from organoleptic assessments using an ULTRASCAN XE HUNTERLAB (TM) calorimeter. It provides data on the following; L—luminosity, a—red/green colour, b—yellow/blue colour and Haze.

The results of the colour analysis are given in Table 3 below:

TABLE 3

Colour analysis on liquors produced for tasting

| Sample | L | a | b |
|---|---|---|---|
| Sri Lankan Control tea | 68.79 | 14.11 | 97.13 |
| $CO_2$ Treated leaf tea | 75.92 | 4.92 | 82.73 |

It was clear from these results that the fermentation reactions involved in black tea manufacture could be initiated using explosive sublimation of carbon dioxide. Furthermore, a black tea could be produced by this process which is not dissimilar from a tea made by traditional methods.

EXAMPLE 2

Figure 1:
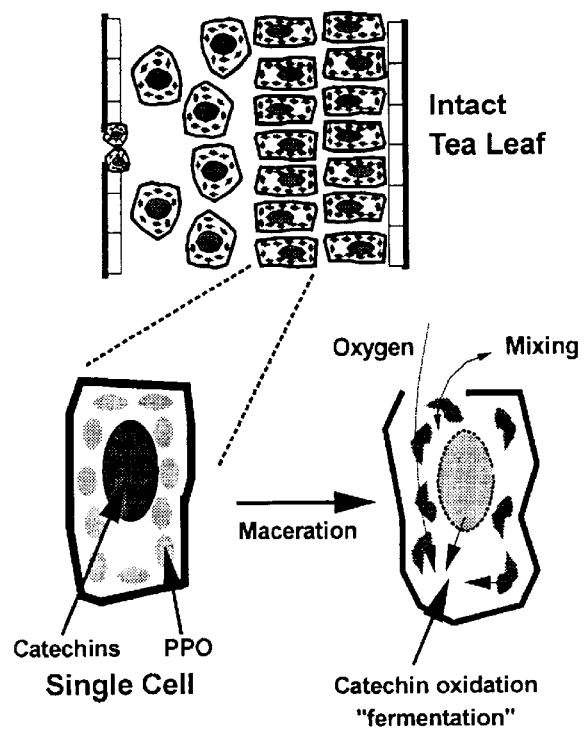
FIG. 1 is a diagram that illustrates the interaction between polyphenol oxidase and catechins in disrupted tea leaves.
Figure 3:
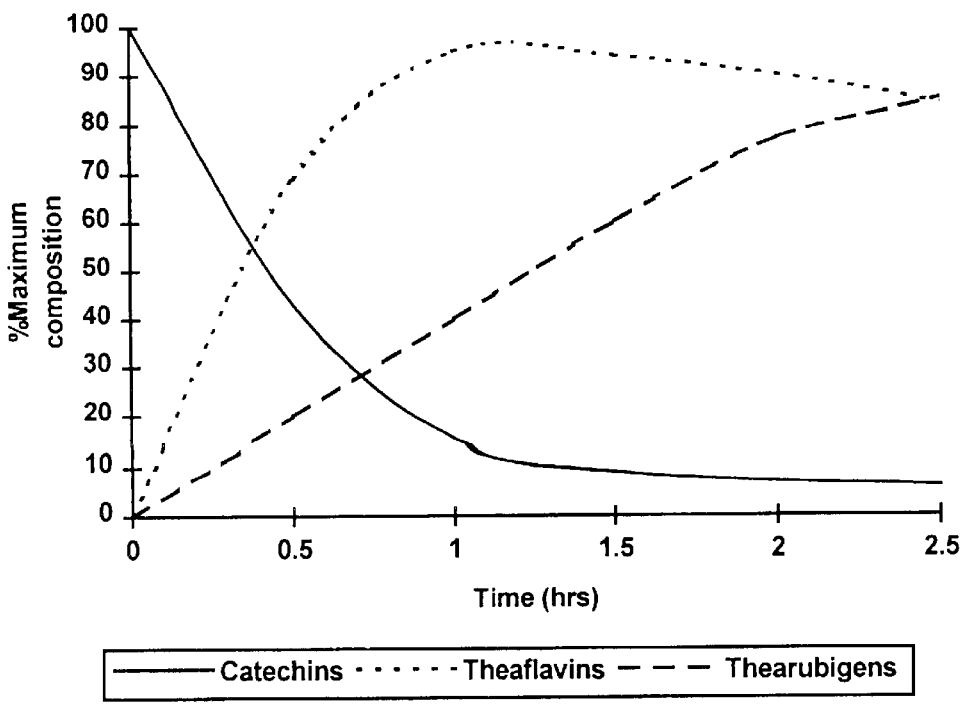
FIG. 3 is a graph showing changes in the levels of catechins, theaflavins and thearubigins in tea during standard black tea fermentation (from Example 2).

Comparison of Fermentation Timecourse of $CO_2$ Treated and Fresh Untreated Leaf Fermentation time course experiments were conducted to monitor the fermentation of both $CO_2$ treated and untreated fresh tea leaves. Black tea fermentation can be measured in terms of changes in the total levels of catechins, theaflavins and thearubigins. FIG. 3 shows the typical changes in the levels of these compounds over a 2.5 hour period.

75 g of Sri Lankan tea was $CO_2$ treated as described in Example 1 except that 4 g samples of leaf were removed and frozen at hourly intervals. The total levels of catechins and theaflavins were measured as described below. Both of these groups of compounds have been shown to be critical to this process. More specifically, catechins are acted upon by tea polyphenol oxidase to form theaflavins via an orthoquinone intermediary. It is thought that it is the action of polyphenol oxidase in these reactions which is critical, as the non-enzymic chemical oxidation of catechins does not lead to the formation of theaflavins. The results are given in Tables 4a, 4b and 5 below and reproduced graphically in FIGS. 4 (total catechins) and 5 (total theaflavins). Changes in total theaflavin levels for the untreated leaf during fermentation are not illustrated in FIG. 7 as none were detected.

Operating Conditions for the Pressure Rig

Operating pressure of 630 psi, equilibrium time of 9 minutes, decompression time of 38 seconds and heat treatment at 38° C. for 5 seconds.

Preparation of Extracts for HPLC Analysis

The extraction process involved incubating a known mass of leaf, which had been freeze dried and powdered, for a total of 20 minutes in 70% methanol. The incubation step was split into two separate 10 minute extractions with 5 ml of 70% methanol being used for each. After each extraction step the sample was centrifuged and the extract was decanted off. The resultant solvent extract was then made up to 10 ml by volume before 1 ml of a stabiliser solution was added (250 ppm L-Ascorbic acid and EDTA in 10% Acetonitrile). These were then stored at −70° C. until needed for HPLC analysis. In order to measure the efficiency of the extraction then a ground sample of PG TIPS (TM) tea was extracted in duplicate with each set of samples.

HPLC Analysis of Solvent Extracts

This analysis was carried out using a PERKIN ELMER (TM) HPLC system; Series 200 Pump, LC 290 UV/Vis detector, 101 Column oven and an ISS 200 (TM) autoinjector, with the data from the analysis being captured and analysed using the UNICAM 4880 (TM) data capture system. For each analysis run the accuracy of the injector was measured using an appropriate solution (catechins—gallic acid, theaflavins—PG INSTANT (TM) tea powder) and a standard agreement check performed. The operating methods for the catechin and theaflavin analysis are outlined below.

(a) Catechins

Column: NUCLEOSIL (TM), 15 cm, 3 mm ODS, 0.46 cm diameter. Detector: 280 nm. The solvent system for this protocol was A: 2% Acetic acid in Acetonitrile and B: 2% Acetic acid aqueous. The pump was set at (1) 5% A isocratic for 10 minutes; (2) 5–18% A gradient (+1) for 30 minutes; (3) 18% A isocratic 10 minutes; (4) 50% A gradient (0) for 5 minutes; and (5) 5% A isocratic for 15 minutes.

(b) Theaflavins:

Column: HYPERSIL (TM), 10 cm, 3 mm ODS, 0.46 cm diameter. Detector: 280 nm. The solvent system for this protocol was A: 2% Acetic acid in Acetonitrile and B: 2% Acetic acid aqueous. The pump was set for 20% A, running isocratically for 12 minutes.

Figure 4:
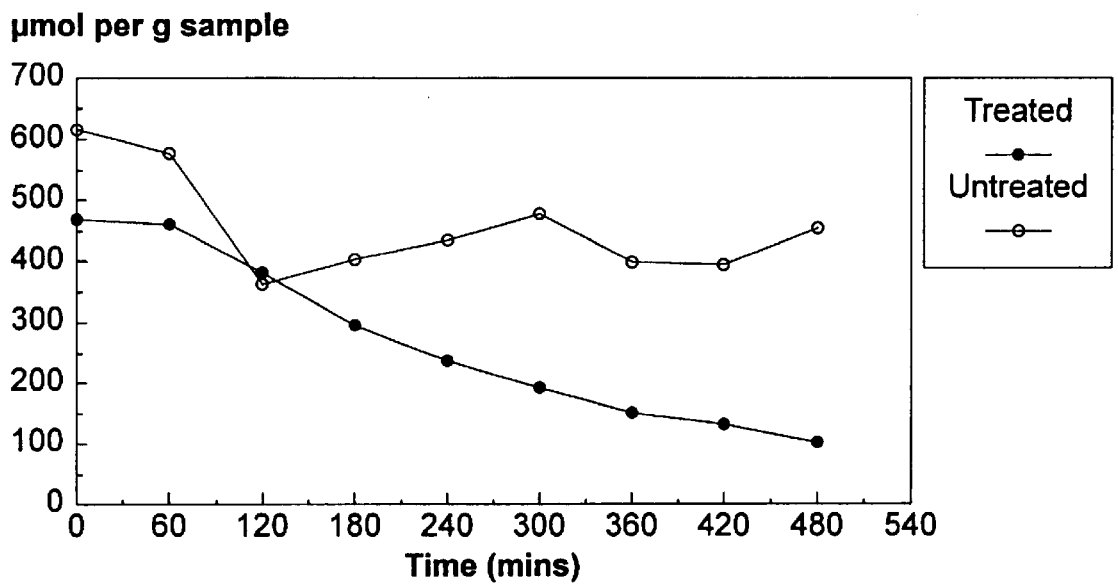
FIG. 4 is a graph comparing the change of total catechins in untreated and treated tea leaf during fermentation (from Example 2, Tables 4a and 4b).

TABLE 4a

μmol/gram dry weight of individual catechins and total catechins in freeze dried leaf samples from the control (See FIG. 4)

| Sample | EGC | +C | EC | EGCG | ECG | Total catechins |
|---|---|---|---|---|---|---|
| 0 Hours | 18.8 | 3.8 | 53.9 | 388.9 | 151.3 | 616.7 |
| 1 Hours | 24.2 | 5.5 | 39.6 | 378.5 | 129.7 | 577.5 |
| 2 Hours | 11.01 | 4.8 | 38.8 | 225.0 | 83.3 | 363.0 |
| 3 Hours | 10.9 | 4.2 | 36.8 | 260.2 | 91.0 | 403.1 |
| 4 Hours | 4.1 | 2.6 | 37.7 | 289.8 | 100.4 | 434.5 |
| 5 Hours | 20.1 | 0.6 | 40.7 | 306.6 | 110.2 | 478.1 |
| 6 Hours | 11.2 | 3.5 | 35.5 | 240.1 | 108.2 | 398.4 |
| 7 Hours | 17.1 | 3.5 | 29.1 | 251.9 | 92.5 | 394.2 |
| 8 Hours | 17.6 | 4.6 | 32.6 | 288.5 | 110.5 | 453.9 |

(Where EGC, +C, EC, EGCG and ECG are as before)

TABLE 4b

Fermentation time course showing μmol per gram dry weight of individual catechins and total catechins in freeze dried leaf from the $CO_2$ treated sample (see FIG. 4)

| Sample | EGC | +C | EC | EGCG | ECG | Total catechins |
|---|---|---|---|---|---|---|
| 0 hrs | 27.1 | 20.0 | 42.2 | 280.1 | 100.2 | 469.6 |
| 1 hrs | 20.1 | 22.3 | 42.1 | 271.4 | 105.1 | 461.0 |
| 2 hrs | 15.2 | 21.1 | 35.1 | 230.1 | 79.8 | 381.3 |
| 3 hrs | 17.1 | 23.1 | 30.4 | 159.8 | 65.1 | 295.5 |
| 4 hrs | 13.1 | 22.1 | 15.6 | 127.4 | 58.5 | 236.7 |
| 5 hrs | 12.4 | 18.4 | 12.4 | 96.3 | 53.2 | 192.7 |
| 6 hrs | 9.1 | 12.7 | 10.6 | 71.2 | 47.6 | 151.2 |
| 7 hrs | 10.2 | 8.8 | 5.0 | 69.4 | 38.6 | 132.0 |
| 8 hrs | 7.1 | 7.8 | 4.8 | 51.7 | 31.2 | 102.6 |

(Where EGC, +C, EC, EGCG and ECG are as before)

TABLE 5

Figure 5:
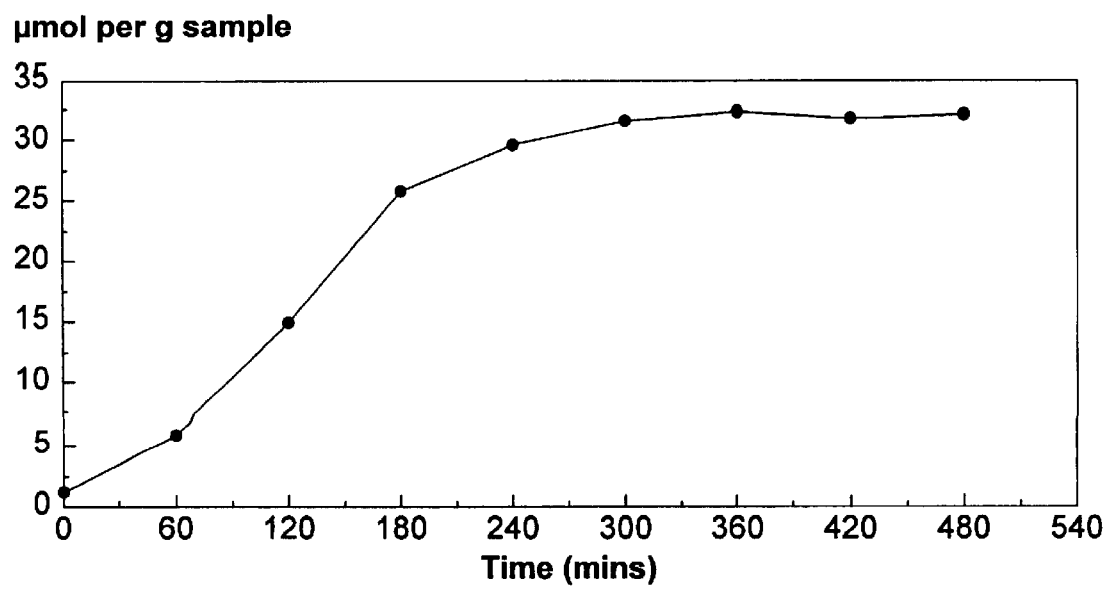
FIG. 5 is a graph showing the change in total theaflavins present in treated leaf during fermentation (from Example 2, Table 5).

Fermentation time course showing μmol per gram dry weight of individual theaflavins and total theaflavins in freeze dried leaf from the $CO_2$ treated sample (see FIG. 5)

| Sample | TF | TF (mono) | TF' (mono) | TF(di) | Total TFs |
|---|---|---|---|---|---|
| 0 Hours | 0.2 | 0.4 | 0.2 | 0.4 | 1.2 |
| 1 Hours | 1.7 | 1.3 | 0.9 | 2.0 | 5.9 |
| 2 Hours | 3.9 | 4.1 | 2.1 | 4.8 | 14.9 |
| 3 Hours | 5.8 | 6.0 | 3.9 | 10.1 | 25.8 |
| 4 Hours | 7.0 | 7.8 | 4.6 | 10.2 | 29.6 |
| 5 Hours | 7.2 | 8.2 | 4.7 | 11.5 | 31.6 |
| 6 Hours | 7.3 | 8.3 | 4.8 | 11.9 | 32.3 |
| 7 Hours | 7.1 | 8.0 | 4.6 | 12.1 | 31.8 |
| 8 Hours | 7.1 | 8.5 | 4.7 | 11.8 | 32.1 |

(Where TF, TF(mono), TF' (mono), and TF(di) are as before)

It can be seen from FIGS. 4 and 5 that if tea leaf is plucked and then 'fermented' then the level of catechins present will decrease slowly, approximately 15% in 8 hours, with no resultant formation of theaflavins. However, when the leaf is treated with carbon dioxide the rate of catechin loss in the leaf is faster, approximately 80% in 8 hours and theaflavins are formed in the leaf.

EXAMPLE 3

Comparison of Fermentation Timecourse of $CO_2$ Treated and CTC Treated Leaf 75 g of Sri Lankan leaf was treated and fermented as described in Example 2. Further to this 300 g of leaf was passed through a CTC machine three times before being fermented under the same conditions as the $CO_2$ treated leaf. 4 g samples of both the $CO_2$ and CTC treated leaf were taken at regular intervals, hourly for the $CO_2$ leaf and every 20 minutes for the CTC leaf. These samples were then analysed as per Example 2.

Operating Conditions for the Pressure Rig

Operating pressure of 630 psi, equilibrium time of 8 minutes, decompression time of 35 seconds and heat treatment of 39° C. for 5 seconds.

Figure 6:
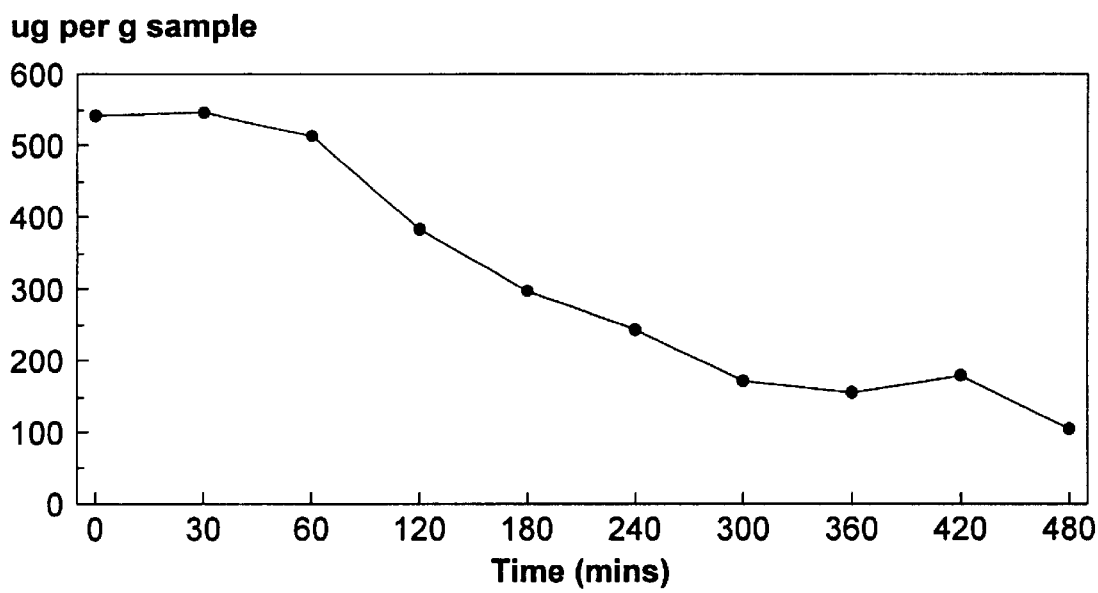
FIG. 6 is a graph showing the change in total catechin levels present during fermentation of $CO_2$ treated leaf samples (from Example 3, Table 6).
Figure 7:
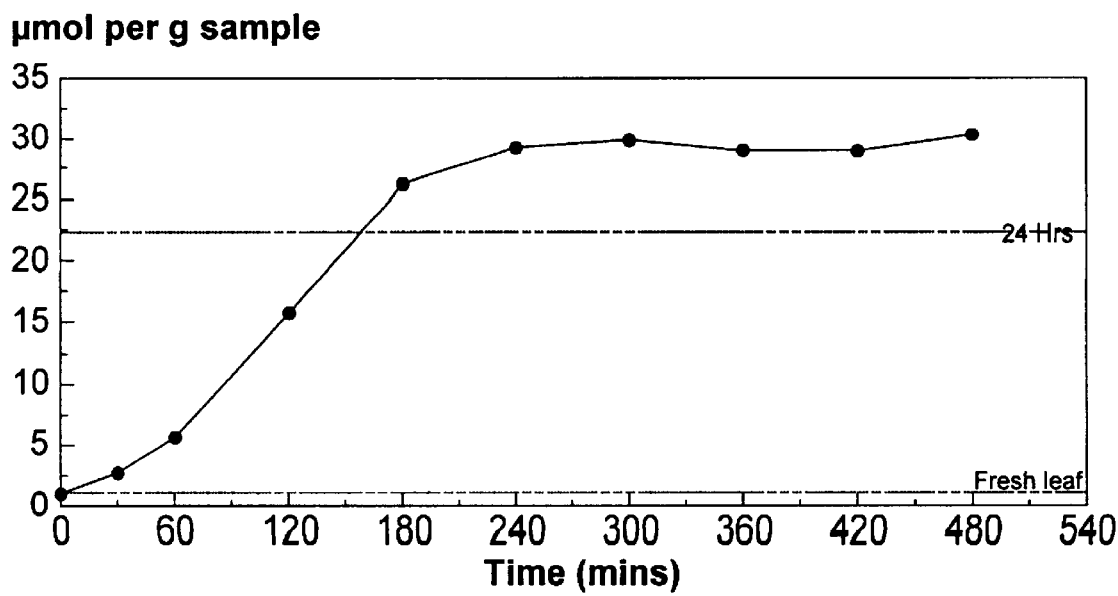
FIG. 7 is a graph showing the change in total theaflavin levels present during fermentation of $CO_2$ treated leaf samples (from Example 3, Table 7).

The results for the $CO_2$ treated samples are given in Tables 6 (catechins) and 7 (theaflavins) and reproduced graphically in FIGS. 6 and 7. The data for the CTC manufactured samples are given in Tables 8 (catechins) and 9 (theaflavins) and reproduced graphically in FIGS. 8 and 9.

TABLE 6

μmol per gram dry wt of individual catechins and total catechins in freeze-dried $CO_2$ treated leaf samples (see FIG. 6)

| Sample | EGC | +C | EC | EGCG | ECG | Total Catechins |
|---|---|---|---|---|---|---|
| Fresh | 77.2 | 11.5 | 19.6 | 364.3 | 103.0 | 575.7 |
| 0 Hours | 124.5 | 18.4 | 46.7 | 269.7 | 82.5 | 541.8 |
| .5 Hours | 114.7 | 24.7 | 39.8 | 274.3 | 92.5 | 546.0 |
| 1 Hour | 104.5 | 19.4 | 40.8 | 266.1 | 82.1 | 512.9 |
| 2 Hours | 88.0 | 24.3 | 27.0 | 164.9 | 78.3 | 382.5 |
| 3 Hours | 78.0 | 19.1 | 17.3 | 120.0 | 62.8 | 297.2 |
| 4 Hours | 49.0 | 19.5 | 15.6 | 101.4 | 57.9 | 243.2 |
| 5 Hours | 37.7 | 14.2 | 8.8 | 66.6 | 44.3 | 171.6 |
| 6 Hours | 45.1 | 9.6 | 5.0 | 55.2 | 40.7 | 155.7 |
| 7 Hours | 44.4 | 11.5 | 9.6 | 68.0 | 45.2 | 178.8 |
| 8 Hours | 34.3 | 11.6 | 2.1 | 30.9 | 25.6 | 104.4 |
| 24 Hours | 12.3 | 2.3 | >0.1 | 10.5 | 17.5 | 42.6 |

(Where EGC is epigallocatechin, +C is catechin, EC is epicatechin, EGCG is epigallocatechin gallate and ECG is epicatechin gallate)

TABLE 7

Fermentation time course showing μmol per gram dry weight of individual theaflavins and total theaflavins in freeze-dried $CO_2$ treated leaf samples (see FIG. 7)

| Sample | TF | TF (mono) | TF' (mono) | TF(di) | Total TFs |
|---|---|---|---|---|---|
| Fresh leaf | 0.3 | 0.2 | 0.3 | 0.3 | 1.1 |
| 0 Hours | 0.3 | 0.2 | 0.3 | 0.3 | 1.0 |
| 0.5 Hours | 0.9 | 0.6 | 0.5 | 0.7 | 2.8 |
| 1 Hour | 2.1 | 1.2 | 1.1 | 1.3 | 5.6 |
| 2 Hours | 4.3 | 3.7 | 2.8 | 5.0 | 15.8 |
| 3 Hours | 6.1 | 6.1 | 4.2 | 9.8 | 26.1 |
| 4 Hours | 7.1 | 7.2 | 4.9 | 10.1 | 29.3 |
| 5 Hours | 5.9 | 7.4 | 4.5 | 12.1 | 29.9 |
| 6 Hours | 5.3 | 7.1 | 4.4 | 12.2 | 29.0 |
| 7 Hours | 6.8 | 7.3 | 4.6 | 10.4 | 29.0 |
| 8 Hours | 6.7 | 8.1 | 4.2 | 11.3 | 30.3 |
| 24 Hours | 3.9 | 6.0 | 3.4 | 8.9 | 22.3 |

(Where TF is theaflavin, TF(mono) is theaflavin-3-gallate, TF' (mono) is theaflavin-3'-gallate, and TF(di) is theaflavin-3,3'-gallate)

TABLE 8

Figure 8:
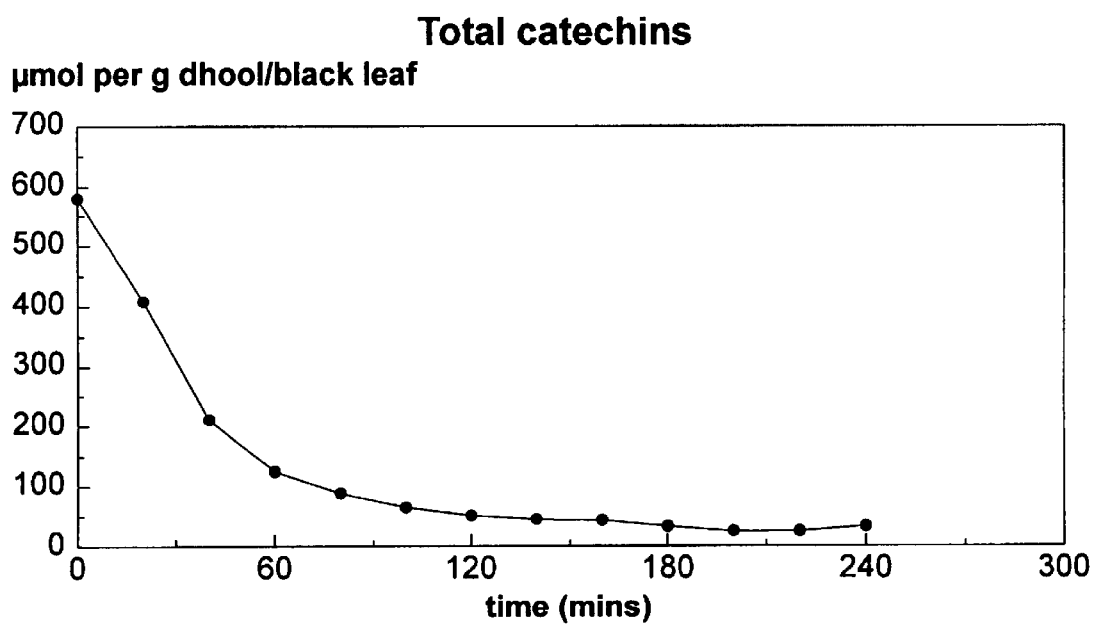
FIG. 8 is a graph showing the change in total catechins in CTC dhool during traditional fermentation (from Example 3, Table 8).

Fermentation time course showing μmol per gram dry weight of individual catechins and total catechins in freeze dried leaf from the traditionally manufactured sample (see FIG. 8)

| Sample | EGC | +C | EC | EGCG | ECG | Total catechins |
|---|---|---|---|---|---|---|
| 0 min | 102.6 | 19.6 | 63.6 | 304.4 | 89.7 | 580.0 |
| 20 min | 59.7 | 21.1 | 41.1 | 179.8 | 106.1 | 407.9 |
| 40 min | 21.4 | 19.8 | 19.7 | 105.2 | 45.5 | 211.7 |
| 60 min | 10.5 | 12.5 | 6.6 | 67.7 | 27.7 | 125.0 |
| 80 min | 0.0 | 9.3 | 1.6 | 57.6 | 20.6 | 89.0 |
| 100 min | 0.0 | 4.0 | 0.0 | 48.2 | 13.3 | 65.5 |
| 120 min | 0.0 | 0.0 | 0.0 | 41.4 | 10.3 | 51.6 |
| 140 min | 0.0 | 0.0 | 0.0 | 37.9 | 7.5 | 45.4 |
| 160 min | 0.0 | 0.0 | 0.0 | 36.5 | 7.2 | 43.7 |
| 180 Min | 0.0 | 0.0 | 0.0 | 30.0 | 3.4 | 33.4 |
| 200 Min | 0.0 | 0.0 | 0.0 | 24.6 | 0.9 | 25.5 |
| 220 Min | 0.0 | 0.0 | 0.0 | 24.7 | 0.8 | 25.5 |
| 240 Min | 0.0 | 0.0 | 0.0 | 32.9 | 0.4 | 33.3 |

(Where EGC, +C, EC, EGCG and ECG are as before)

TABLE 9

Figure 9:
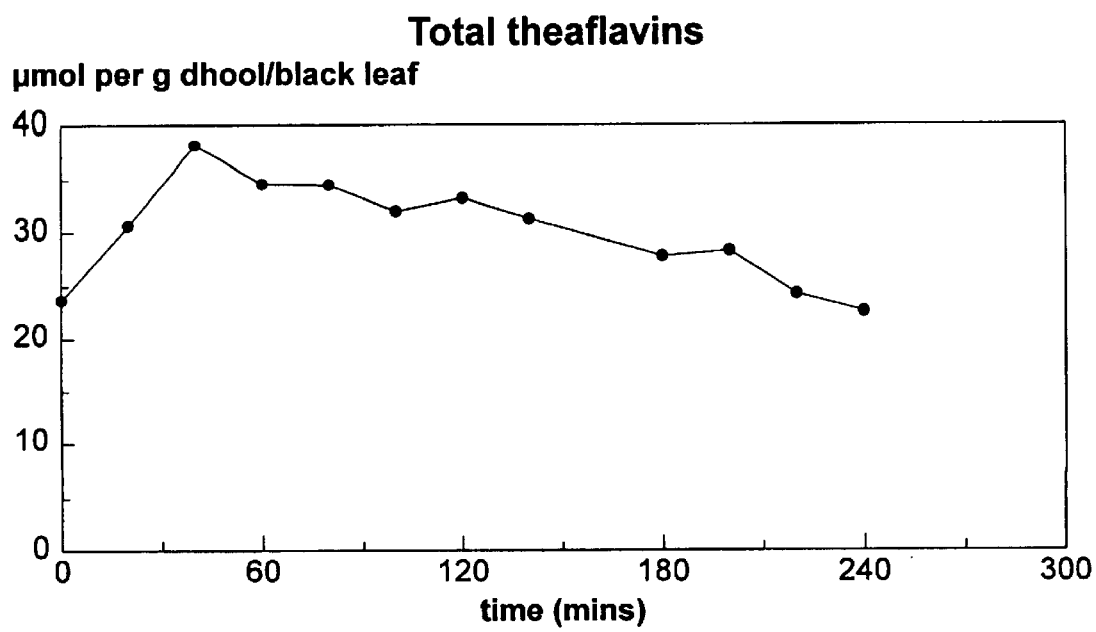
FIG. 9 is a graph showing the change in total theaflavins in CTC dhool during traditional fermentation (from Example 3, Table 9).

Fermentation timecourse showing μmol per gram dry weight of individual theaflavins and total theaflavins in freeze dried leaf from the traditionally manufactured sample (see FIG. 9)

| Sample | TF | TF (mono) | TF' (mono) | TF (di) | Total TFs |
|---|---|---|---|---|---|
| 0 min | 11.4 | 4.7 | 5.2 | 2.3 | 23.6 |
| 20 min | 11.6 | 7.5 | 6.6 | 5.0 | 30.7 |
| 40 min | 12.9 | 10.9 | 7.5 | 7.1 | 38.3 |
| 60 min | 10.8 | 10.6 | 6.3 | 6.8 | 34.6 |
| 80 min | 10.1 | 11.0 | 6.2 | 7.2 | 34.5 |
| 100 min | 8.7 | 10.6 | 5.7 | 7.1 | 32.0 |
| 120 min | 9.3 | 10.7 | 5.9 | 7.3 | 33.3 |
| 140 min | 8.4 | 10.3 | 5.5 | 7.0 | 31.3 |
| 160 min | 4.5 | 1.7 | 2.3 | 0.9 | 9.3 |
| 180 min | 7.1 | 9.3 | 5.0 | 6.4 | 27.8 |
| 200 min | 7.3 | 9.4 | 5.1 | 6.6 | 28.3 |
| 220 min | 5.3 | 8.3 | 4.4 | 6.3 | 24.3 |
| 240 min | 4.5 | 7.8 | 4.2 | 6.0 | 122.6 |

The most obvious difference is the rate at which the fermentation reaction progresses. The present inventors have found in the traditionally manufactured samples the maximum value for total theaflavin content is reached after 40 minutes. It should be noted that in reality this figure is nearer to 60 minutes as the leaf starts to ferment after the first pass through the CTC, the final two passes requiring a further 15 to 20 minutes. However, the maximum theaflavin level in the carbon dioxide treated samples is not reached until after about 5 hours. Importantly though the percentage loss in total catechins at these two maximum levels is similar at about 60%. This suggests that it is only the rate of the reactions that is different, rather than the reactions per se.

Further to this it is not only the rate at which theaflavins are formed that is affected, the rate at which they are polymerised to form thearubigins is also slowed. The present inventors have found that it takes a further 19 hours for the total level to drop by 25% whereas in the traditional process this drop takes 90 minutes. The level of theaflavins within the leaf start to fall once the rate at which they are polymerised to form thearubigins exceeds the rate at which they are formed from catechins and orthoquinones.

Figure 10:
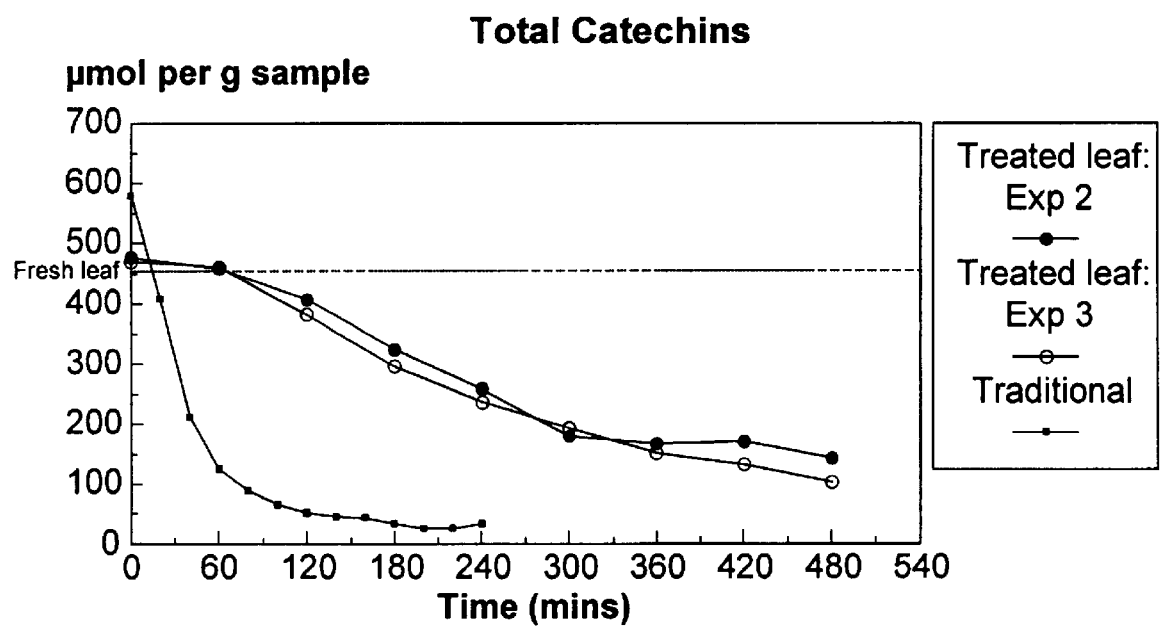
FIG. 10 is a graph comparing the difference in changes of total catechin levels during fermentation as initiated by either traditional CTC methods or by carbon dioxide treatment (from Example 4 and Tables 4a, 6 and 8).
Figure 11:
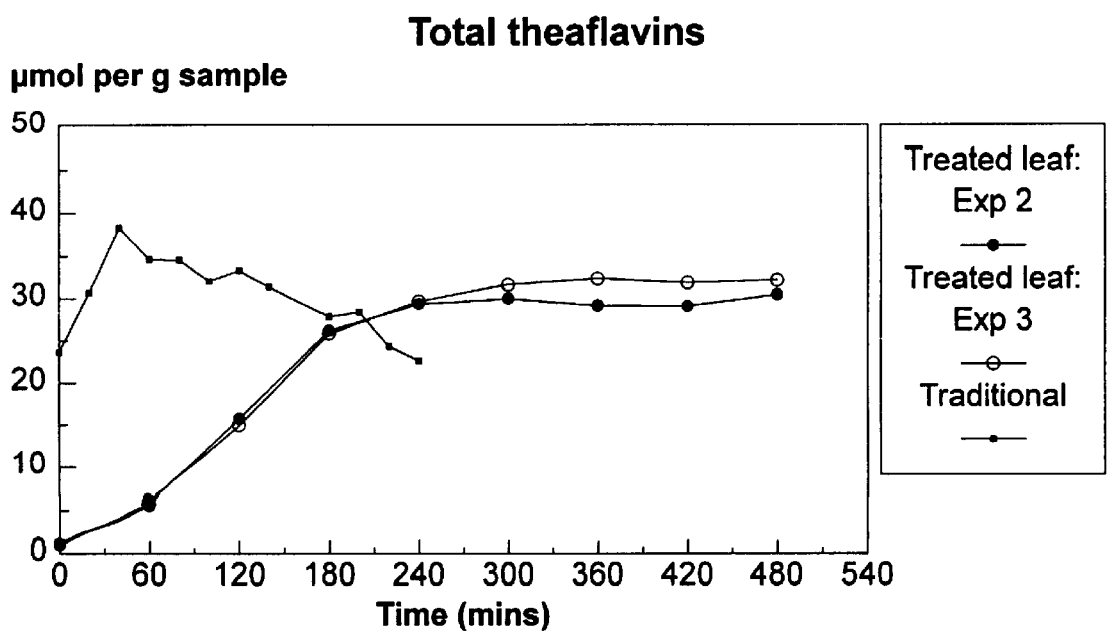
FIG. 11 is a graph comparing the difference in changes of total theaflavin levels during fermentation as initiated by either traditional CTC methods or by carbon dioxide treatment (from Example 4 and Tables 5, 7 and 9).
Figure 12:
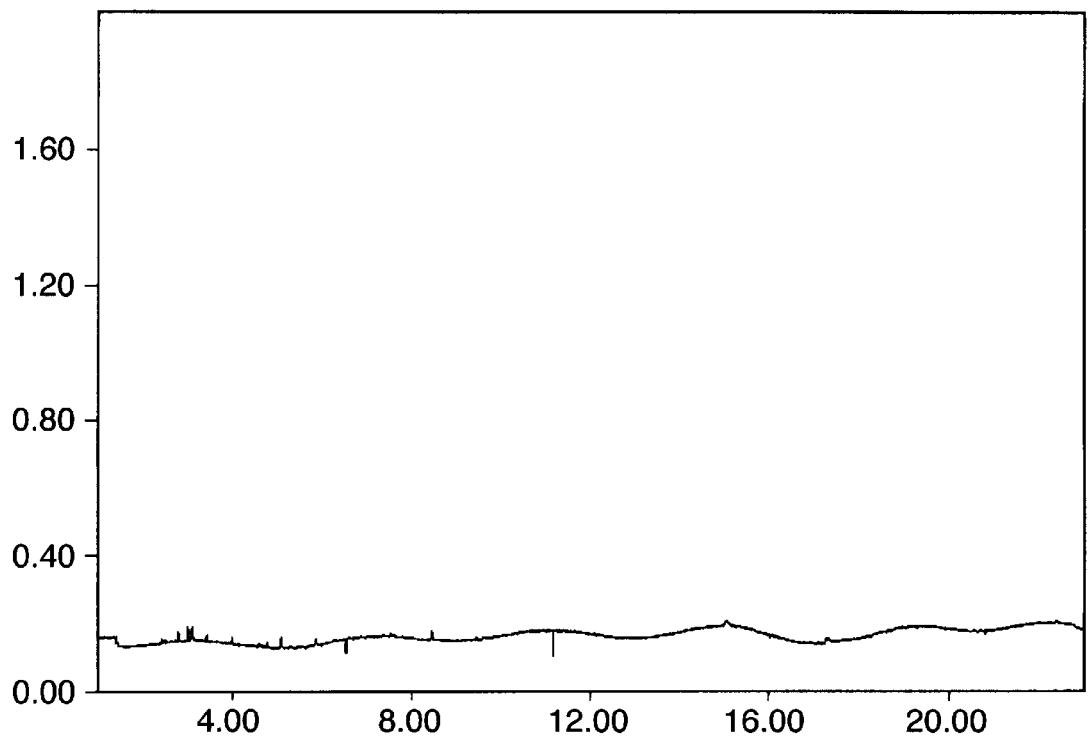
FIG. 12 is a gc trace from fresh leaf tea (Example 6).
Figure 13:
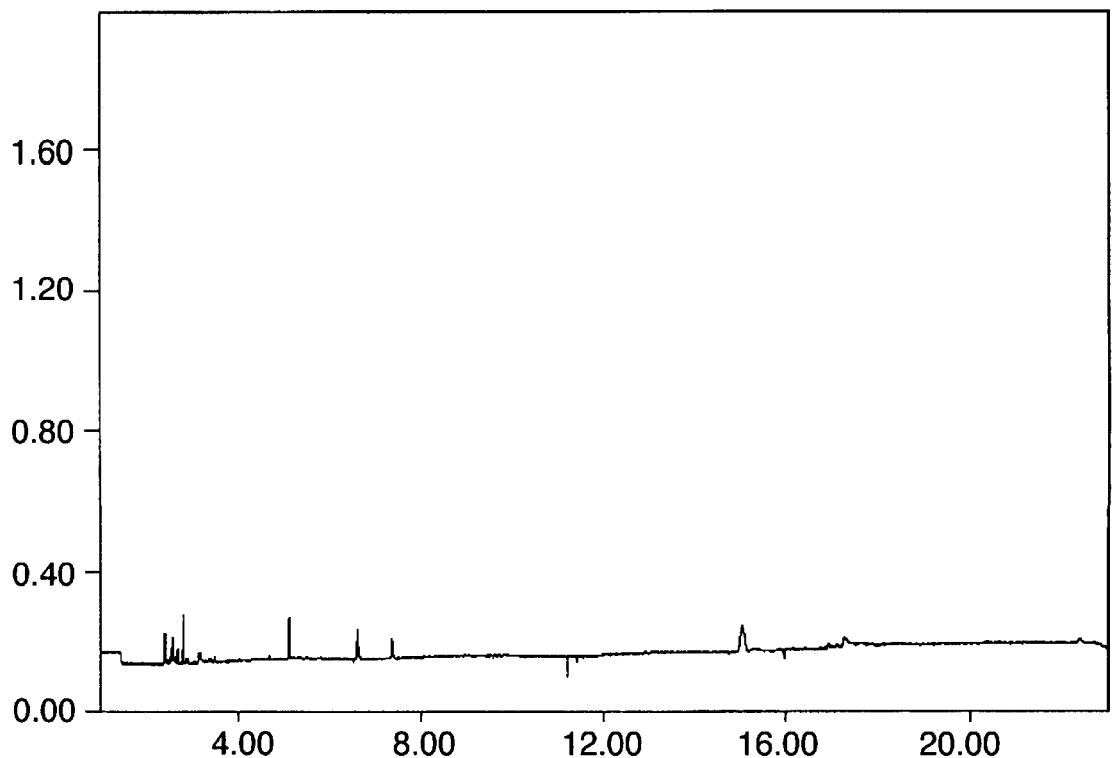
FIG. 13 is a gc trace from withered tea leaf (Example 6).
Figure 14:
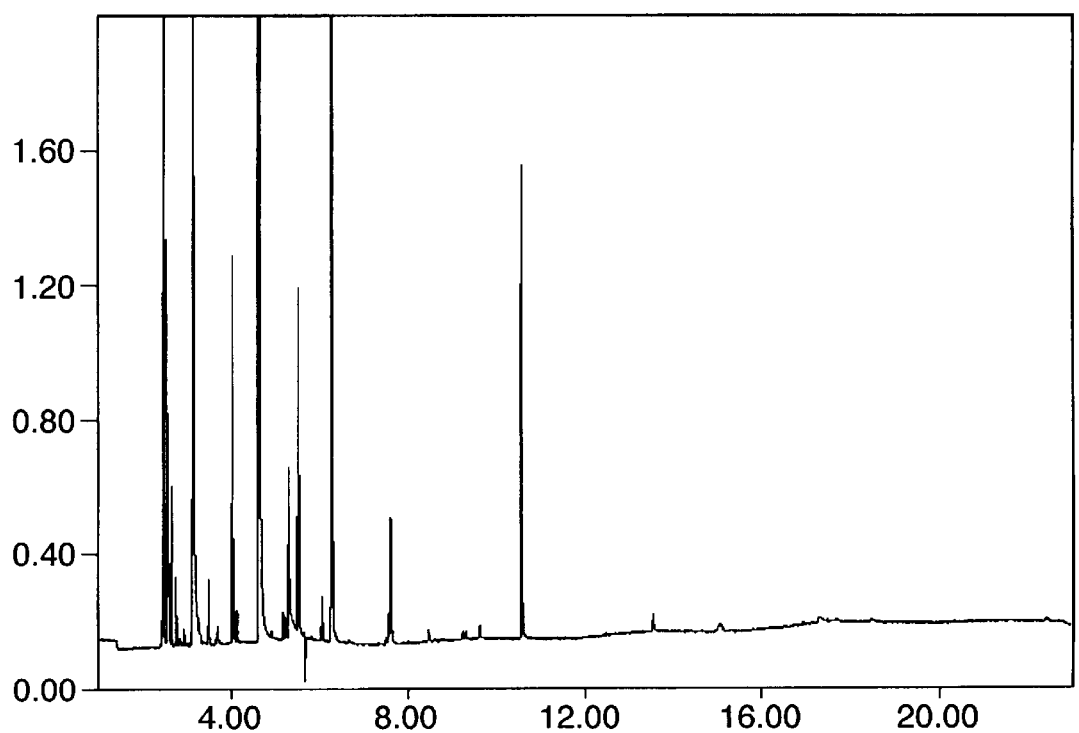
FIG. 14 is a gc trace from $CO_2$ treated fresh tea leaf (Example 6).
Figure 15:
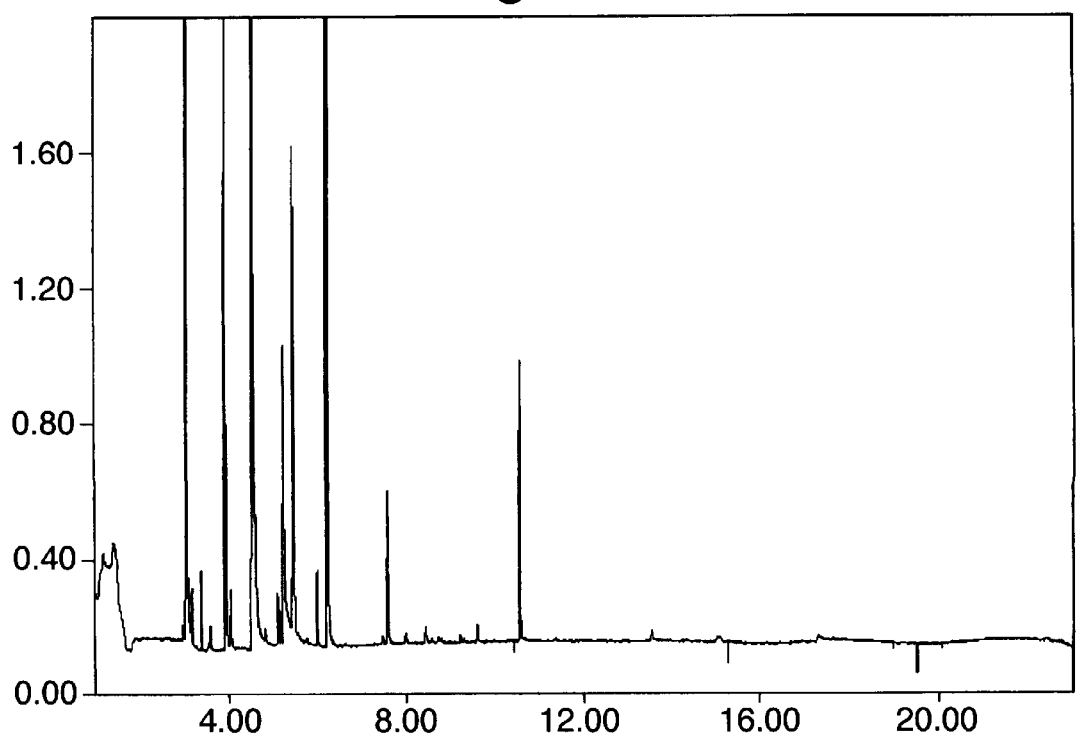
FIG. 15 is a gc trace from $CO_2$ treated withered tea leaf (Example 6).

These results can be seen in perspective when plotted on graphs containing the results from Examples 2 and 3. FIG. 10 shows the difference in changes of total catechin levels during fermentation as initiated by either traditional methods or by carbon dioxide treatment. Similarly, FIG. 11 shows the difference in changes of total theaflavin levels during fermentation as initiated by either traditional methods or by carbon dioxide treatment.

EXAMPLE 5

Manufacture of Black Tea Using the Carbon Dioxide Process

Black tea was processed by the traditional and carbon dioxide processing methods previously described. The moisture and total soluble solids contents were measured as described below and the teas were tasted as described in Example 1.

Operating Conditions for the Pressure Rig

Operating pressure of 640 psi, equilibrium time of 10 minutes, decompression time of 32 seconds and heat treatment of 40° C. for 5 seconds.

Moisture Measurement

2–3 g of leaf was weighed accurately into a preweighed foil tray and dried overnight in a 100° C. oven. The dried tea was weighed and the weight loss after drying was determined. The moisture content was then calculated as a percentage of the starting weight.

Total Soluble Solids 2 g of tea was weighed accurately into a 500 ml conical flask and was refluxed with boiling water for 1 hour, stirring occasionally. This liquor was filtered into a 200 ml volumetric, cooled and made up to volume. A known mass of liquor was then dried overnight in a preweighed tray and the weight of residue determined. The total soluble solids was calculated by difference. The results can be seen in Table 10 below.

TABLE 10

Moisture and Total Soluble Solids Analysis on teas produced by traditional and carbon dioxide processing methods

| Tea | Moisture | Total soluble solids |
|---|---|---|
| Traditional | 4.91% | 38.2% |
| Carbon Dioxide | 8.07% | 33.4% |

Organoleptic Assessment of Black Tea

The carbon dioxide tea was more orange/yellow in colour than traditional tea and a less brown. In terms of flavour the carbon dioxide tea was less bitter and astringent and was also thinner in mouthfeel. However, it still possessed the characteristic Sri Lankan tea taste though it had less aroma impact than the control and was noticeably less 'green' in smell.

The elevated moisture content in the carbon dioxide sample in comparison to the traditional tea will probably be due to two factors; proportionally more uptake of water during storage and an higher initial moisture content. The carbon dioxide treated tea, which was not comminuted, contained a much higher level of stalk than the traditional tea and this material is highly hydroscopic.

This leads to problems with drying as it is not always possible to remove enough moisture from the stalk before the rest of the tea is scorched. Further to this it will take up more moisture during storage. The increased level of stalk will also have affected the level of total soluble solids, as there are less soluble solids in this leaf material. This will account for some of the difference between the two teas. However, it is possible that the extended fermentation times resulted in a greater proportion of the soluble polyphenolic material being irreversibly bound to the cell wall material of the leaf.

EXAMPLE 6

Comparison of Aroma Profiles of CTC Cut Carbon Dioxide Treated and CTC Cut Untreated Tea This experiment was undertaken in order to determine if the carbon dioxide treatment was having any effect on the generation of tea volatiles during subsequent processing, specifically the green aroma detected in the organoleptic assessment and QDA analysis.

The bud and first two leaves of the fresh flush from Kenyan clone 35 grown in greenhouses at Bedford, United Kingdom were used for the experiment. This batch of leaf was split into two with one half being processed fresh and the other chemically withered for 16 hours at 20° C., 95% R.H. In each case, these batches were split in half again with one half being analysed untreated and the other being treated with $CO_2$ before analysis. 10 g of each leaf sample were analysed for headspace aroma using a PERKIN ELMER™ Headspace gas chromatograph with a HS 40XL CRYOFOCUS™ sampler. The data and results were captured and analysed using a PHILLIPS PU 6030™ data capture unit with a UNICAM 4880™ data system computer programme.

FIGS. 12 to 15 show gc traces from fresh leaf tea, withered tea leaf, $CO_2$ treated fresh tea leaf, and $CO_2$ treated withered tea leaf respectively. They show that significantly more aroma was detected from the $CO_2$ treated samples than the fresh and withered leaf. This would suggest either more aroma is generated in the treated samples or that aroma can be expressed more easily from the leaf surface due to the action of $CO_2$.

What is claimed is:

1. A method for processing whole leaf tea comprising the steps of impregnating tea leaves with liquid carbon dioxide within a pressure vessel, depressurising the vessel at a rate that is sufficient to freeze the liquid carbon dioxide, applying sufficient heat to cause the frozen carbon dioxide to sublime and consequently initiate fermentation within the leaves, allowing the tea to ferment for a time that is sufficient to achieve desired liquor properties, and drying the fermented product to yield the whole leaf tea.

2. A method according to claim 1 wherein the moisture content of the tea leaves prior to the impregnation step is between 20% and 90%.

3. A method according to claim 1 wherein the vessel is depressurised to between about 500 psi and the critical pressure for carbon dioxide in order to freeze the liquid carbon dioxide.

4. A method according to claim 1 wherein at some stage between harvesting the leaves and arresting the fermentation, the whole tea leaves are withered.

5. A method according to claim 1 wherein at some stage between harvesting the leaves and arresting the fermentation, the size or shape of the leaves is physically altered.

6. A method according to claim 1 wherein the fermentation is arrested by firing the leaves.

7. A method for manufacturing a leaf tea that resembles orthodox processed tea but infuses like a CTC processed tea that comprises initiating fermentation of whole tea leaves by carbon dioxide puffing and terminating the fermentation when desired infusion properties have been achieved.

8. A method according to claim 7 wherein the whole tea leaves that have been fermented are blended with traditionally processed tea or tea granules in order to meet predetermined liquor characteristics.

9. A method according to claim 2 wherein the moisture content of the tea leaves prior to the impregnation step is between 50% and 80%.

* * * * *